R. H. RICE.
CUSHIONING DEVICE FOR AUTOMOBILES AND OTHER VEHICLES.
APPLICATION FILED OCT. 12, 1908.
No. 920,999. Patented May 11, 1909.
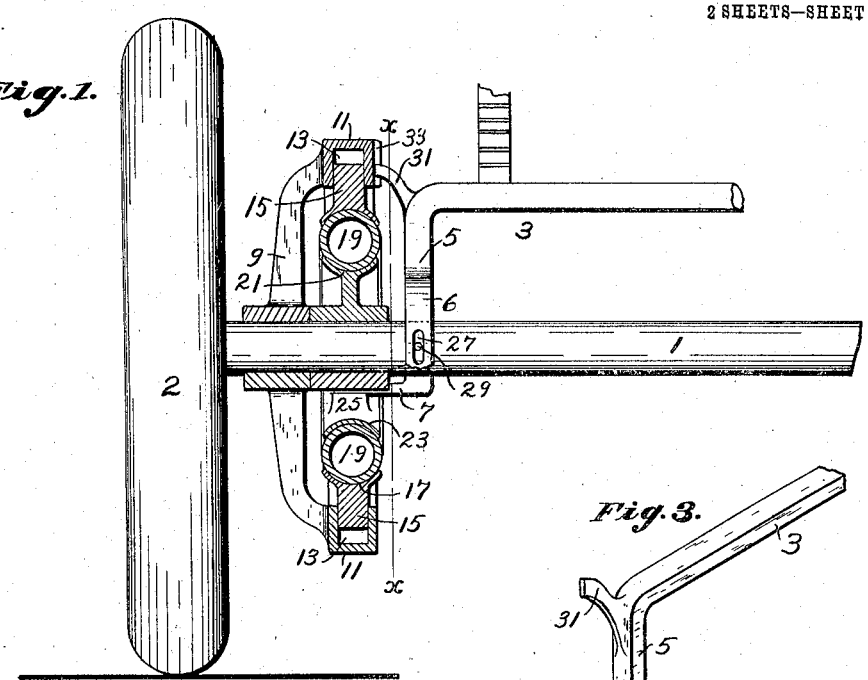
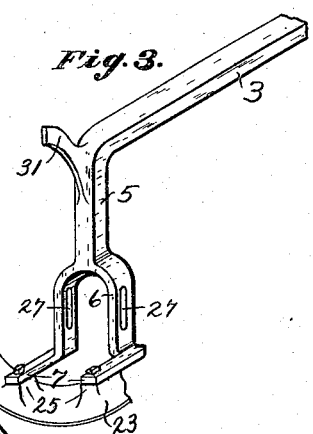
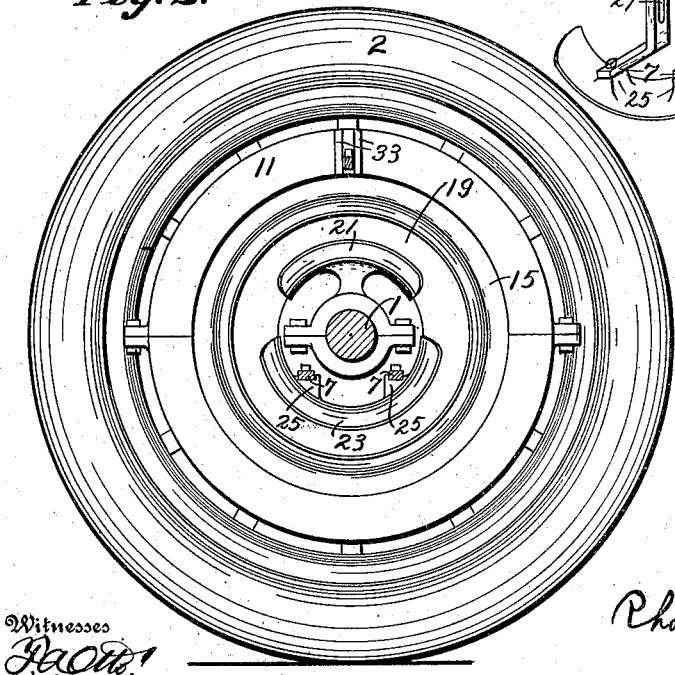
Inventor
Rhodolphus H. Rice R. H. RICE.
CUSHIONING DEVICE FOR AUTOMOBILES AND OTHER VEHICLES.
APPLICATION FILED OCT. 12, 1908.

920,999.

Patented May 11, 1909.
2 SHEETS—SHEET 2.

Witnesses
Inventor

UNITED STATES PATENT OFFICE.

RHODOLPHUS H. RICE, OF MILWAUKEE, WISCONSIN.

CUSHIONING DEVICE FOR AUTOMOBILES AND OTHER VEHICLES.

No. 920,999.     Specification of Letters Patent.     Patented May 11, 1909.

Application filed October 12, 1908. Serial No. 457,247.

*To all whom it may concern:*

Be it known that I, RHODOLPHUS H. RICE, a citizen of the United States, residing at Milwaukee, in the county of Milwaukee and State of Wisconsin, have invented a new and useful Cushioning Device for Automobiles and other Vehicles, of which the following is a specification.

My invention relates to improvements in cushioning devices for automobiles and other vehicles.

The object of my invention is to provide a pneumatic cushion in which the first shock communicated through the axle bar from the wheel will not be directly transmitted through the cushion to the vehicle body, but will be exerted to compress a body of air and the excess pressure distributed and diffused so that the body of the vehicle will be only slightly affected.

In the following description, reference is had to the accompanying drawings, in which—

Figure 4:
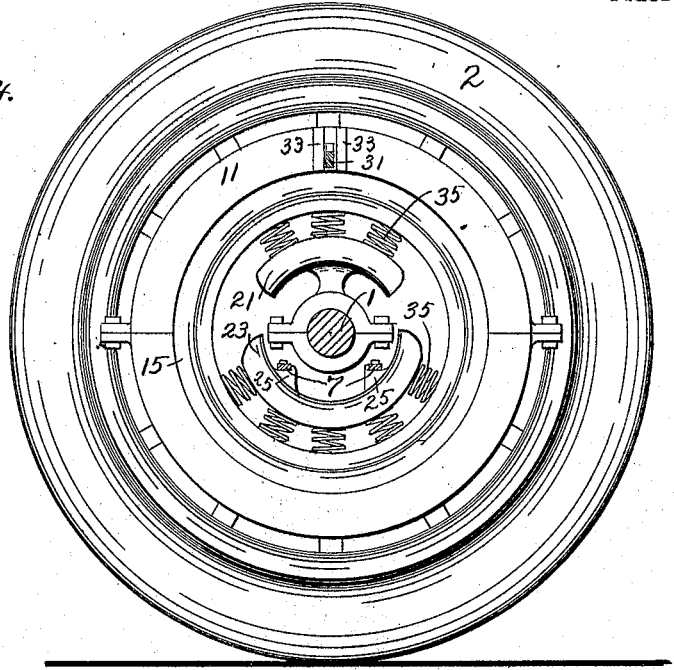
Figure 5:
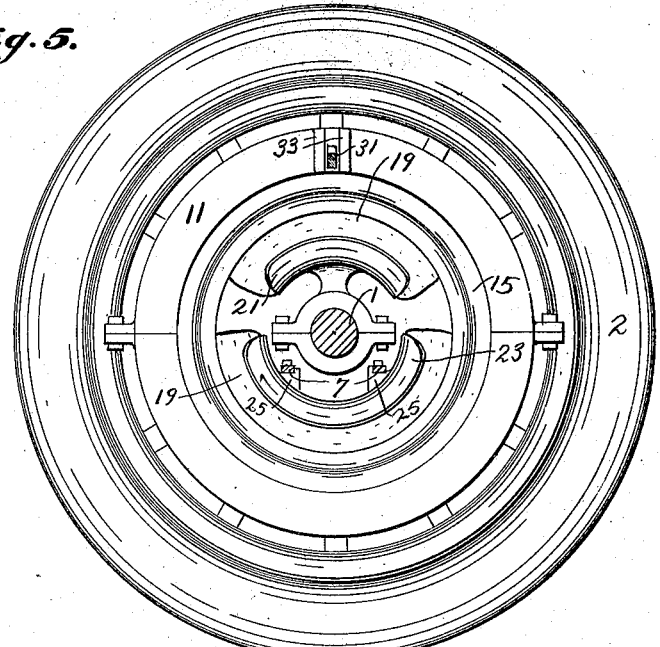

Figure 1 is a detail rear elevation, partially in vertical section on the line of the axle bar, of a portion of an automobile running gear embodying my invention. Fig. 2 is a cross sectional view drawn on line x—x of Fig. 1. Fig. 3 is a perspective view of the body supporting frame bar. Fig. 4 is a view on the same line as Fig. 2, showing springs employed as a substitute for the pneumatic cushion ring. Fig. 5 is a similar view showing cushion employed as a substitute for springs shown in Fig. 4.

Like parts are identified by the same reference characters throughout the several views.

The automobile axle bar 1 and wheel 2 may be of any ordinary construction. A frame bar 3, from which the body is supported, is provided with downwardly extending arms 5, having a yoke 6 which straddles the axle bar 1, with arms 7 on each side extending substantially parallel with the axle bar but preferably in a lower plane.

A frame 9, mounted upon the axle bar, is provided with a guide ring 11 having an annular channel 13 in its inner face, in which a vibratory reinforcing ring 15 is seated. This ring 15 has a cylindrically concave inner face 17, which forms a seat for a flexible pneumatic cushion ring 19, which also encircles the axle bar, the latter being provided with a seat 21 clamped to the axle bar 1 and upon which the pneumatic cushion ring 19 rests. The horizontal arms 7 of the frame bar 3 are supported from the inner surface of the ring 19 below the axle, by a metallic member 23 provided with shoulders 25 which form rests for these arms, and may if desired be formed integral with the arms 7 and the bar 3. This member 23 is directly supported by the cushion ring 19, being hung in the lower portion of such ring and the entire weight of the vehicle body is supported from these members 23 and is applied through such members to the lower portion of the cushion rings, the load being thus suspended from the members 21 and the axle, while the stress of such suspension is borne by the encircling ring 15 which prevents the cushion ring 19 from distending vertically. The down pressure of the load upon the lower portion of the ring 19, however, tends to compass the confined air and produces an equal up pressure upon the upper portion of the encircling ring 15 which tends to lift the latter to the same extent that the load in the lower portion tends to depress it.

The yoke 6 of the frame bar 3 is preferably provided with vertical slots 27 in its respective arms in which pins 29 on the axle bar are entered and serve as guides. To prevent a rotation of the frame bar about the axle bar, the arm 5 is provided with a lug 31, which extends between guide lugs 33 on the ring 11.

It is not material to my invention whether the body of the vehicle is mounted directly upon the horizontal portion of the bar 3 or whether it is supported therefrom by springs.

It will, of course, be understood that the cushioning devices are duplicated at the respective ends of the axle bar.

With the described construction, any sudden shock received by the wheel and transmitted to the axle bar will produce an upward pressure upon the seat 21 and the upper portion of the ring 19. The force is then exerted in part to expand the neutral portions of the ring, in part to lift the ring 15 and in part to increase the upward pressure upon the member 23 and arms 7. The shock is therefore diffused, causing but slight and gradual movements in the body of the vehicle.

It will, of course, be understood that if desired, springs 35 may be employed in substitution for the pneumatic cushion, or the cushioning devices whether pneumatic or not may be independent above and below the axle bar as shown in Fig. 5.

Having thus described my invention, what I claim as new and desire to secure by Letters Patent is—

1. In a vehicle, the combination with the axle bar, of a pneumatic cushioning ring encircling the axle bar and supported therefrom, a member seated in said ring below the axle bar, and a body supporting frame bar mounted upon said member and movable independent of the axle.

2. In a vehicle, the combination with the axle bar, of a pneumatic cushioning ring encircling the axle bar and supported therefrom, a member seated in said ring below the axle bar, and a frame bar mounted upon said member, together with a reinforcing ring encircling the cushioning ring and bearing upon its periphery and a guide ring supported from the axle bar, and provided with a channel in its inner surface in which the reinforcing ring engages.

3. In a vehicle, the combination with the axle bar, of a pneumatic cushioning ring encircling the axle bar and supported therefrom, a member seated in said ring below the axle bar, and a body supporting frame bar mounted upon said member and movable independently of the axle, said frame bar being forked and having guide bearing connection with the respective sides of the axle bar.

4. In a vehicle, the combination with the axle bar, of a pneumatic cushioning ring encircling the axle bar and supported therefrom, a member seated in said ring below the axle bar, and a frame bar mounted upon said member, together with a reinforcing ring encircling the cushioning ring and bearing upon its periphery, and a guide ring supported from the axle bar, and provided with a channel in its inner surface in which the reinforcing ring engages, said frame bar having vertically sliding connection with the guide ring and axle bar.

5. In a vehicle, the combination with the axle bar, a support connected therewith, of a pneumatic cushioning ring provided with a metallic peripheral covering, and having its upper portion hung upon said support, and a body supporting frame member seated in the lower portion of said ring and vertically movable independently of the axle, said frame member having a vertically sliding bearing upon the axle.

6. In a vehicle, the combination with the axle bar, a support connected therewith, of a pneumatic cushioning ring provided with a metallic peripheral covering, and having its upper portion hung upon said support, and a body supporting frame member connected with the lower portion of said ring.

7. In a vehicle, the combination with the axle bar, of a raised segmental member mounted transversely thereon, a pneumatic cushion ring encircling the axle and having its upper portion seated upon said member, another segmental member unconnected with the axle and seated in the lower portion of the ring, and a body supporting frame member mounted upon said last mentioned member.

8. In a vehicle, the combination of a body supporting frame member, a pneumatic cushion encircling the axle, and suspended from the upper portion thereof with the lower portion of said cushion hanging free from the axle, and having a supporting connection with the frame member.

9. In a vehicle, the combination with the axle bar, of a pneumatic cushioning ring encircling the axle and supported therefrom, a body supporting member seated in the lower portion of said ring, and movable independently of the axle, and a bodily movable reinforcing member supporting the outer surface of the cushioning ring.

In testimony whereof I affix my signature in the presence of two witnesses.

RHODOLPHUS H. RICE.

Witnesses:
F. A. OTTO,
MARY COLLINGE.